United States Patent
Xie

(10) Patent No.: US 8,383,291 B2
(45) Date of Patent: Feb. 26, 2013

(54) THREE-DIMENSIONAL HYDROPHILIC POROUS STRUCTURES FOR FUEL CELL PLATES

(75) Inventor: Tao Xie, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 987 days.

(21) Appl. No.: 12/119,647

(22) Filed: May 13, 2008

(65) Prior Publication Data
US 2008/0292939 A1    Nov. 27, 2008

Related U.S. Application Data

(60) Provisional application No. 60/939,678, filed on May 23, 2007.

(51) Int. Cl.
*H01M 2/14* (2006.01)
*H01M 8/04* (2006.01)
(52) U.S. Cl. .................................................. 429/516
(58) Field of Classification Search ............ 429/30, 429/34, 512, 516
See application file for complete search history.

(56) References Cited

U.S. PATENT DOCUMENTS

| | | | | |
|---|---|---|---|---|
| 5,806,586 A | * | 9/1998 | Osthues et al. | 165/174 |
| 5,942,347 A | * | 8/1999 | Koncar et al. | 429/30 |
| 6,251,308 B1 | * | 6/2001 | Butler | 252/511 |
| 6,413,664 B1 | * | 7/2002 | Wilkinson et al. | 429/34 |
| 2003/0068542 A1 | * | 4/2003 | Harada et al. | 429/34 |
| 2004/0151975 A1 | * | 8/2004 | Allen | 429/38 |

FOREIGN PATENT DOCUMENTS

CN    101595585 A    12/2009

OTHER PUBLICATIONS

Tsujioka et al., A New Preparation Method for Well-Controlled 3D Skeletal Epoxy Resin-Pased Polymer Monoliths, Macromolecues, Nov. 29, 2005, vol. 38, No. 24, pp. 9901-9903.
Lim et al., Photoreversibly Switchable Superhydrophobic Surface with Erasable and Rewritable Pattern, J. Am. Chem. Soc., 128, 2006, pp. 14458-14459.
Liu et al., Controlled Switchable Surface, Chem. Eur. J., 11, 2005, pp. 2622-2631.
Lahann et al., Smart Materials with Dynamically Controlled Surfaces, MRS Bulletin, Mar. 2005, vol. 30, pp. 185-188.
U.S. Appl. No. 12/119,652, filed May 13, 2008; Inventor: Tao Xie, Title: Hydrophilic/Hydrophobic Patterned Surfaces and Methods of Making and Using the Same.

* cited by examiner

*Primary Examiner* — Jennifer Michener
*Assistant Examiner* — Eli Mekhlin
(74) *Attorney, Agent, or Firm* — BrooksGroup

(57) ABSTRACT

One embodiment includes three-dimensional hydrophilic porous structures for fuel cell collector plates.

12 Claims, 2 Drawing Sheets

THREE-DIMENSIONAL HYDROPHILIC POROUS STRUCTURES FOR FUEL CELL PLATES

This application claims the benefit of U.S. Provisional Application No. 60/939,678, filed May 23, 2007.

TECHNICAL FIELD

The field to which the disclosure generally relates includes fuel cell components including three-dimensional hydrophilic porous structures for use with solid fuel cell plates.

BACKGROUND

Fuel cells are known to include collector plates such as bipolar or unipolar plates which serve to collect electrons generated from the consumption of fuel by the fuel cell and to deliver fuel cell reactant gases through reactant gas flow fields. These reactant gas flow fields are defined by one or more channels that have been machined, stamped, etched, molded or otherwise provided in a solid substrate which typically is made from a metal or composite material. The collector plates may be provided adjacent a diffusion media material which typically is a porous material such as carbon paper. Alternatively, in some arrangements, the collector plate may make direct contact to a catalytic electrode. Optionally, a microporous layer may underlie the gas diffusion media layer and a catalytic electrode may underlie the microporous layer or gas diffusion media layer. A polyelectrolyte membrane is provided underneath the first catalytic electrode and a second catalytic electrode is provided underlying a second face of the polyelectrolyte membrane. A second microporous layer may be provided underlying the second catalytic electrode and a second gas diffusion media layer underlying the second microporous layer or second catalytic electrode. A second collector plate is provided underlying the second gas diffusion media layer. The second collector plate also includes a reactant gas flow field defined by a plurality of channels and lands. The lands make physical contact with the gas diffusion media layer.

To facilitate water management in fuel cells, it is desirable to introduce hydrophilicity onto bipolar plate surfaces. Treating a bipolar plate surface to introduce surface hydrophilicity may be accomplished with an initial water contact angle no more than 15° (superhydrophilicity); with durability so that the water contact angle is stable enough not to exceed 15° throughout the life of the fuel cells; and the hydrophilic treatment does not adversely impact the contact resistance of the plates beyond an acceptable level.

Heretofore, silicon dioxide coatings have been used to selectively introduce hydrophilic characters to portions of bipolar plates. However, such and other organic based hydrophilic coatings suffer from: poor adhesion (under either wet or dry conditions) on substrates such as stainless steel; contamination due to the high surface energy of the superhydrophilic surface which is easily contaminated by less hydrophilic contaminants; dissolution, wherein the silicon dioxide can dissolve in the fuel cell environment via reaction with membrane degradation by products such as HF; thermal degradation, wherein coatings such as organic coatings age upon repeated exposure at temperatures of 90° and above and through repeated dry and wet cycles which lead to reorientation of hydrophilic groups on the top surface of such coatings, thus reducing the hydrophilicity thereof; electrochemical degradation, wherein certain hydrophilic groups in the substitution environment of a fuel cell can be electrochemically active and degrade.

SUMMARY OF EXEMPLARY EMBODIMENTS OF THE INVENTION

One embodiment of the invention includes a product comprising a fuel cell collector plate having a reactant gas flow field defined therein by a plurality of channels and lands; and a three-dimensional porous hydrophilic structure substantially filling the channels.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes a method of introducing hydrophilicity into bipolar or unipolar plate flow channels. Three-dimensional porous hydrophilic structures are placed in or formed in the collector plate flow channels. The three-dimensional structures have interconnected porous structures. The porosity of the three-dimensional structures may be provided by a means for producing porosity which may include, but is not limited to, a porogen or blowing agent which produces a porous, open cell structure. The porogen may be any material that may be later sacrificed or removed by etching, dissolving, or by heating the porogen to cause it to flow out of the three-dimensional structure. Suitable blowing agents may include any blowing agent known to those skilled in the art useful with polymeric, ceramic, or metallic materials.

Figure 1:
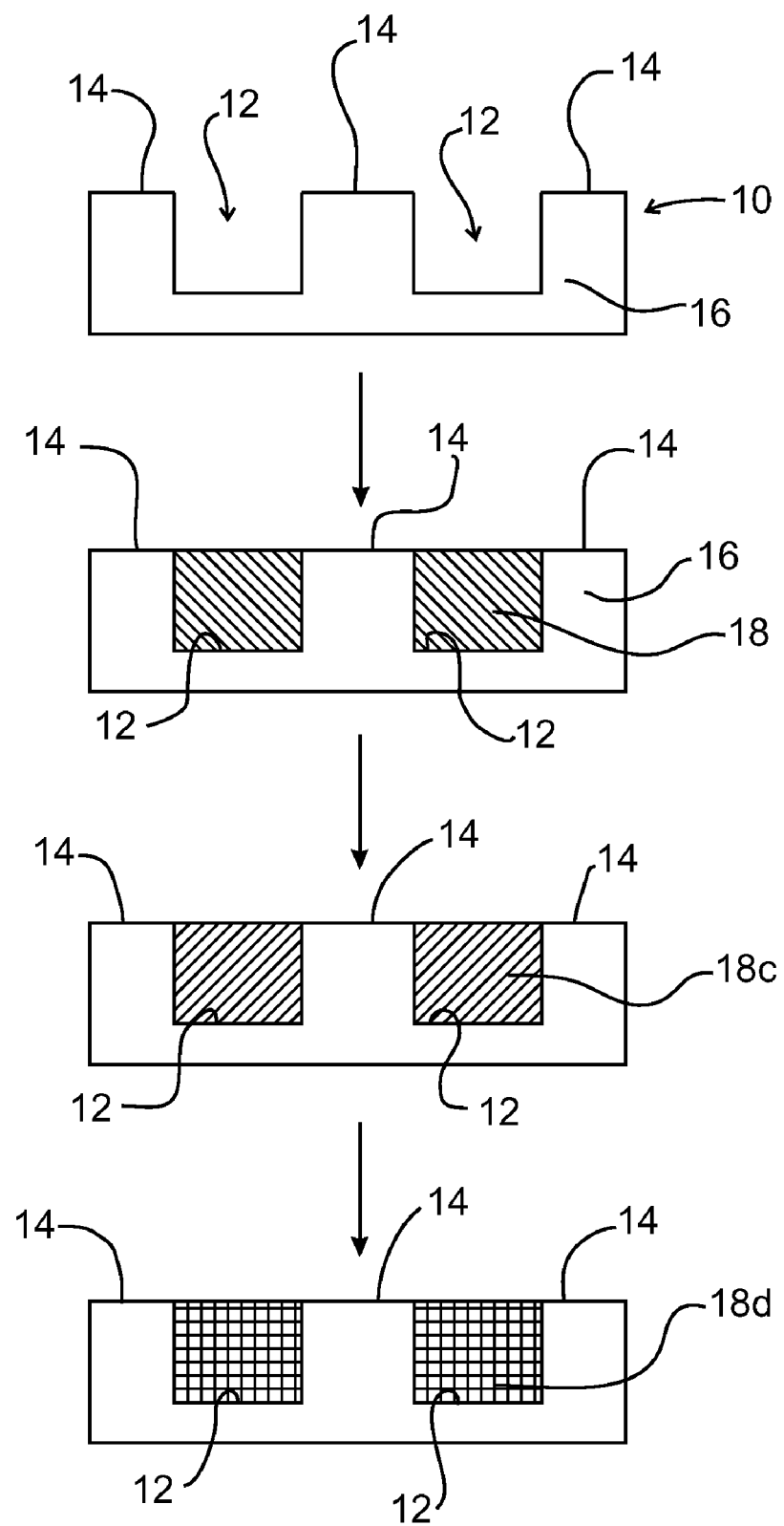
FIG. 1 illustrates a method according to one embodiment of the invention.

Referring now to FIG. 1, one embodiment of the invention includes providing a fuel cell collector plate 10 having a reactant gas flow field defined therein by plurality of channels 12 and lands 14. The channels 12 may be formed in a substrate 16 which may be formed from a composite material or a metal such as stainless steel, aluminum, titanium or other alloy. The channels 12 may be machined, stamped, etched, or molded into the substrate 16. The channels 12 may be filled with a material that may be formed into a solid, and a porogen or a blowing agent. In the process of forming the material into a solid, the blowing agent produces porous structures in the formed solid. Alternatively, upon forming the solid, the porogen may be later removed by dissolving, etching, or heating the porogen causing it to form a liquid and flowing the liquid out of the three-dimensional structure remaining in the collector plate channel 12. In one embodiment, the channels 12 are filled with a first material 18 which may include a monomer, crosslinker, and a porogen. The monomer is cured, for example by heating or exposure to UV light, in a second step to provide a cured material 18c with a porogen. Thereafter, the porogen is removed, resulting in a cross-linked three-dimensional porous structure 18d in the channel 12. The monomer may be chosen to have a hydrophilic character upon curing so that the three-dimensional porous structure is hydrophilic. Alternatively, an additional step of chemically modifying the three-dimensional structure in the channel 12 may be used to introduce hydrophilicity into the three-dimensional structure.

In another embodiment of the invention, the three-dimensional hydrophilic porous structure may be produced ex-situ using a mold with an identical geometry to the flow channels 12 of the fuel cell collector plate 10. In addition, the porous structure may be made from a variety of other materials including, but not limited to, metals and ceramics. Preferably, the material selected for the three-dimensional structure is chemically resistant to the fuel cell environment. Any polymer that is resistant to HF is preferred. Furthermore, because the material in the channel 12 is three-dimensional, problems associated with the adhesion of two-dimensional coatings on bipolar plate surfaces are overcome.

The three-dimensional porous structure is not a gas diffusion media layer. The gas diffusion media layer typically is carbon fibers in the form of carbon paper or felt.

Figure 2:
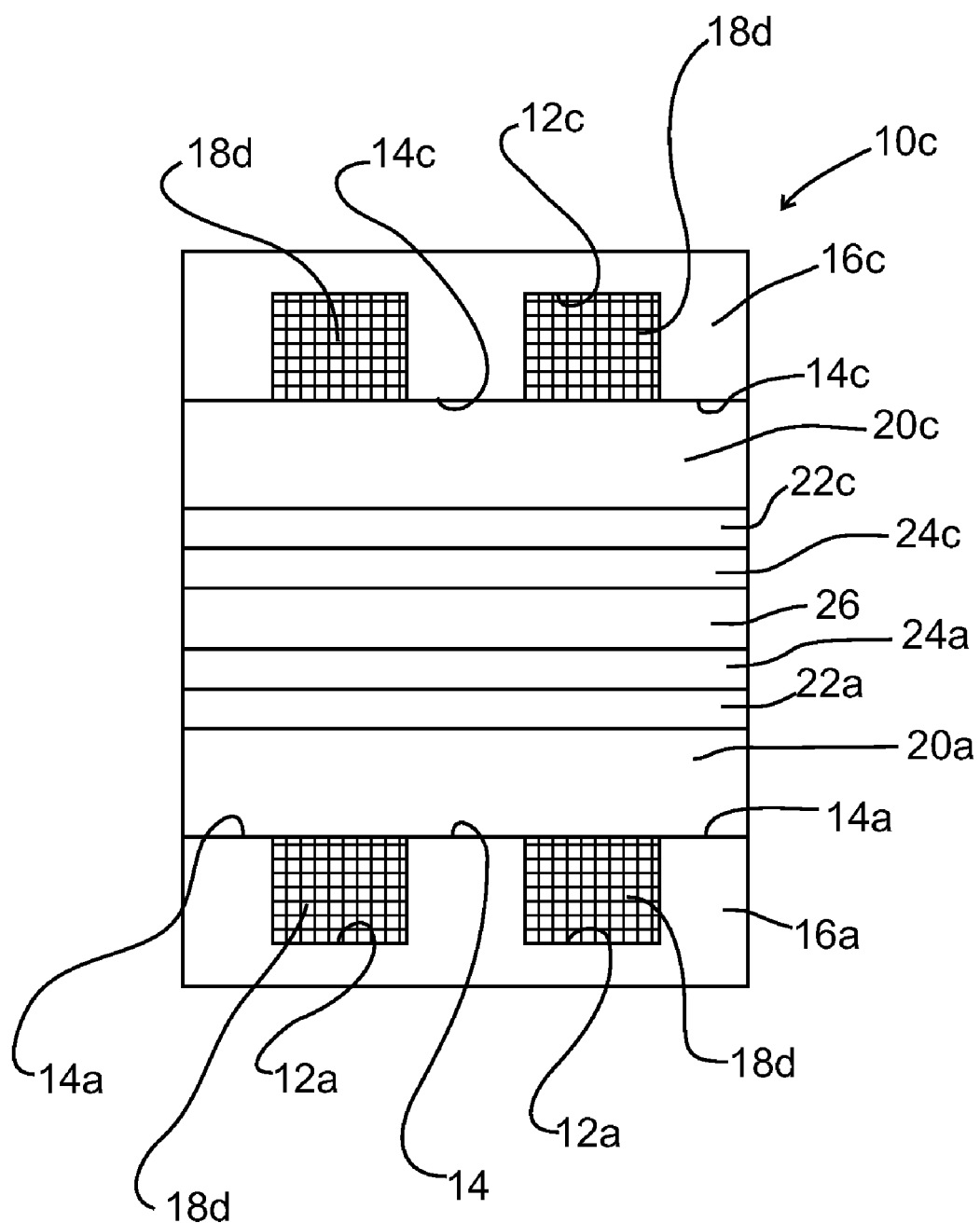
FIG. 2 illustrates a product according to one embodiment of the invention.

Referring now to FIG. 2, another embodiment of the invention includes a product 10c, such as a fuel cell or fuel cell stack, having a first bipolar plate 16c having a reactant gas flow field defined therein by a plurality of lands 14c and channels 12c with a cross-linked three-dimensional porous structure 18d in the channel 12c. A first gas diffusion media layer 20c may underlie the first bipolar plate 16c. The first gas diffusion media layer 20c may include a plurality of carbon fibers in the form of carbon paper or carbon felt. A microporous layer 22c may be provided underlying the first gas diffusion media layer 20c. The microporous layer 22c preferably is coated on the first gas diffusion media layer 20c and may include a plurality of carbon particles in a polytetrafluoroethylene binder. A cathode electrode 24c may underlie the first microporous layer 22c. The cathode electrode 24c may include a catalyst such as platinum supported on a plurality of carbon particles and including an ionomer such as NAFION. A polyelectrolyte membrane 26 may underlie the cathode 24c. The polyelectrolyte membrane 26 may be formed from an ionomer such as NAFION and may be supported by a sheet of expanded polytetrafluoroethylene, if desired. An anode layer 24a may underlie the polyelectrolyte membrane 26 and may be constructed similar to the cathode layer 24c. A second microporous layer 22a may underlie the anode layer 24a. A second gas diffusion media layer 20a may underlie the second microporous layer 22a. A second bipolar plate layer 16a having a reactant gas flow field defined therein by a plurality of lands 14a and channels 12a with a cross-linked three-dimensional porous structure 18d in the channels 12a.

The above description of embodiments of the invention is merely exemplary in nature and, thus, variations thereof are not to be regarded as a departure from the spirit and scope of the invention.

What is claimed is:

1. A method comprising:
providing a fuel cell bipolar plate having a first face with a reactant gas flow field defined therein, the reactant gas flow field being defined at least in part by a plurality of lands and channels;
filling the channels with a first material, the first material being capable of being solidified, the first material comprising a means for forming pores; and
thereafter forming the first material into a three-dimensional porous structure in the solid state wherein the three-dimensional porous structure has interconnected porous structures.

2. A method as set forth in claim 1 wherein the three-dimensional solid structure is hydrophilic.

3. A method as set forth in claim 1 further comprising treating the three-dimensional porous structure to introduce hydrophilicity.

4. A method as set forth in claim 1 further comprising forming a hydrophilic coating over at least a portion of the three-dimensional porous structure.

5. A method as set forth in claim 1 wherein the first material comprises a monomer, a crosslinker, and a porogen or blowing agent.

6. A method as set forth in claim 1 wherein the first material comprises a prepolymer.

7. A method as set forth in claim 1 wherein the first material comprises a ceramic.

8. A method as set forth in claim 1 wherein the first material comprises a metal.

9. A method comprising:
providing a fuel cell bipolar plate having a reactant gas flow field formed in a first face thereof, the reactant gas flow field comprising a plurality of lands and channels; and
placing a porous three-dimensional structure into and substantially filling a plurality of the channels where in the three-dimensional structure has interconnected pores.

10. A method as set forth in claim 9 wherein the three-dimensional porous structure is hydrophilic.

11. A method as set forth in claim 9 further comprising treating the three-dimensional porous structure to introduce hydrophilicity thereto.

12. A method as set forth in claim 9 further comprising coating at least a portion of the three-dimensional porous structure with a hydrophilic coating.

\* \* \* \* \*